United States Patent
Larranaga et al.

(10) Patent No.: US 6,466,424 B1
(45) Date of Patent: Oct. 15, 2002

(54) CIRCUIT PROTECTIVE DEVICE WITH TEMPERATURE SENSING

(75) Inventors: Javier Ignacio Larranaga, Bristol; Joseph Criniti, Britain; Farshid Attarian, Collinsville, all of CT (US); Marshall Aurnou, Peterborough (CA)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/474,488

(22) Filed: Dec. 29, 1999

(51) Int. Cl.$^7$ ................................................. H02H 5/00
(52) U.S. Cl. ....................................... 361/103; 361/106
(58) Field of Search ............................... 361/93.1, 93.8, 361/99, 103, 106, 160, 161; 307/117; 250/338.1; 324/501; 340/638–643, 662, 664, 588, 589; 337/1, 5, 102, 299, 344; 374/171

(56) References Cited

U.S. PATENT DOCUMENTS

| | | | |
|---|---|---|---|
| 3,401,363 A | 9/1968 | Vyskocil et al. ............... 335/17 |
| 3,443,258 A | 5/1969 | Dunham et al. ............... 337/79 |
| 3,596,218 A | 7/1971 | Layton ........................ 335/17 |
| 3,596,219 A | 7/1971 | Erickson ...................... 335/17 |
| 4,019,097 A | * 4/1977 | Miller et al. | |
| 4,208,690 A | 6/1980 | McGinnis et al. ............ 361/48 |
| 4,345,288 A | 8/1982 | Kampf et al. ................. 361/31 |
| 4,466,071 A | 8/1984 | Russell, Jr. .................. 364/492 |
| 4,513,268 A | 4/1985 | Seymour et al. .............. 335/35 |
| 4,513,342 A | 4/1985 | Rocha ......................... 361/94 |
| 4,552,018 A | 11/1985 | Legatti et al. ................ 73/431 |
| 4,573,259 A | 3/1986 | Seymour et al. ........... 29/602 R |
| 4,589,052 A | 5/1986 | Dougherty ................... 361/94 |
| 4,598,183 A | 7/1986 | Gardner et al. ........... 200/50 A |
| 4,641,216 A | 2/1987 | Morris et al. ................. 361/45 |
| 4,641,217 A | 2/1987 | Morris et al. ................. 361/45 |
| 4,658,322 A | 4/1987 | Rivera ........................ 361/37 |
| 4,667,263 A | 5/1987 | Morris et al. ................. 361/42 |
| 4,672,501 A | 6/1987 | Bilac et al. ................... 361/96 |
| 4,686,600 A | 8/1987 | Morris et al. ................. 361/42 |
| 4,688,134 A | 8/1987 | Freeman et al. .............. 361/45 |
| 4,702,002 A | 10/1987 | Morris et al. ................ 29/837 |
| 4,847,850 A | 7/1989 | Kafka et al. .................. 372/71 |
| 4,878,143 A | 10/1989 | Kalal et al. ................... 361/94 |
| 4,878,144 A | 10/1989 | Nebon ......................... 361/96 |
| 4,931,894 A | 6/1990 | Legatti ........................ 361/45 |
| 4,936,894 A | 6/1990 | Larson et al. ................. 70/298 |
| 5,089,796 A | 2/1992 | Glennon et al. ............. 335/172 |
| 5,121,282 A | 6/1992 | White .......................... 361/42 |
| 5,185,684 A | 2/1993 | Beihoff et al. ................ 361/45 |
| 5,185,685 A | 2/1993 | Tennies et al. ............... 361/45 |
| 5,185,686 A | 2/1993 | Hansen et al. ................ 361/45 |
| 5,185,687 A | 2/1993 | Beihoff et al. ................ 361/45 |
| 5,206,596 A | 4/1993 | Beihoff et al. .............. 324/536 |
| 5,208,542 A | 5/1993 | Tennies et al. ............. 324/544 |
| 5,223,682 A | 6/1993 | Pham et al. ............. 200/148 R |
| 5,224,006 A | 6/1993 | MacKenzie et al. .......... 361/45 |
| 5,229,730 A | 7/1993 | Legatti et al. ................ 335/18 |

(List continued on next page.)

FOREIGN PATENT DOCUMENTS

| | | | |
|---|---|---|---|
| CA | 2036032 | | 8/1991 |
| JP | 57060635 A | * | 4/1982 |
| JP | 57062720 | * | 4/1982 |
| WO | WO 91/13454 | | 9/1991 |
| WO | WO 95/20235 | | 7/1995 |

*Primary Examiner*—Stephen W. Jackson
(74) *Attorney, Agent, or Firm*—Cantor Colburn LLP

(57) ABSTRACT

A temperature sensor for use in a circuit breaker is disclosed. The temperature sensor is included in the circuit breaker and detects temperature of a target within the current path of the breaker. If the temperature of the target falls within a preselected critical range, a trip signal is triggered in a trip processor board which actuates a solenoid to trip the circuit breaker. A bridge is provided in the current path to continue normal function of the circuit breaker outside the critical range of temperatures.

20 Claims, 2 Drawing Sheets

U.S. PATENT DOCUMENTS

| | | | |
|---|---|---|---|
| 5,245,302 A | 9/1993 | Brune et al. | 335/35 |
| 5,245,498 A | 9/1993 | Uchida et al. | 361/47 |
| 5,250,918 A | 10/1993 | Edds et al. | 335/35 |
| 5,299,730 A | 4/1994 | Pasch et al. | 228/180.22 |
| 5,303,113 A | 4/1994 | Goleman et al. | 361/93 |
| 5,307,230 A | 4/1994 | MacKenzie | 361/96 |
| 5,359,293 A | 10/1994 | Boksiner et al. | 324/544 |
| 5,418,463 A | 5/1995 | Fleming et al. | 324/520 |
| 5,420,740 A | 5/1995 | MacKenzie et al. | 361/45 |
| 5,432,455 A | 7/1995 | Blades | 324/536 |
| 5,434,509 A | 7/1995 | Blades | 324/536 |
| 5,452,223 A | 9/1995 | Zuercher et al. | 364/483 |
| 5,453,723 A | 9/1995 | Fello et al. | 335/18 |
| 5,459,630 A | 10/1995 | MacKenzie et al. | 361/45 |
| 5,475,609 A | 12/1995 | Apothaker | 364/492 |
| 5,483,211 A | 1/1996 | Carrodus et al. | 335/18 |
| 5,485,093 A | 1/1996 | Russell et al. | 324/522 |
| 5,493,278 A | 2/1996 | MacKenzie et al. | 340/638 |
| 5,506,789 A | 4/1996 | Russell et al. | 364/492 |
| 5,510,946 A | 4/1996 | Franklin | 361/56 |
| 5,510,949 A | 4/1996 | Innes | 361/93 |
| 5,512,832 A | 4/1996 | Russell et al. | 324/522 |
| 5,519,561 A | 5/1996 | Mrenna et al. | 361/105 |
| 5,546,266 A | 8/1996 | MacKenzie et al. | 361/93 |
| 5,550,751 A | 8/1996 | Russell | 364/492 |
| 5,561,605 A | 10/1996 | Zuercher et al. | 364/483 |
| 5,578,931 A | 11/1996 | Russell et al. | 324/536 |
| 5,583,732 A | 12/1996 | Seymour et al. | 361/93 |
| 5,590,012 A | 12/1996 | Dollar, II | 361/113 |
| 5,600,526 A | 2/1997 | Russell et al. | 361/65 |
| 5,614,878 A | 3/1997 | Patrick et al. | 335/14 |
| 5,615,075 A | 3/1997 | Kim | 361/87 |
| 5,629,824 A | 5/1997 | Rankin et al. | 361/57 |
| 5,659,453 A | 8/1997 | Russell et al. | 361/93 |
| 5,694,101 A | 12/1997 | Lavelle et al. | 335/172 |
| 5,706,154 A | 1/1998 | Seymour | 361/42 |
| 5,818,671 A | 10/1998 | Seymour et al. | 361/42 |
| 5,831,500 A | 11/1998 | Turner et al. | 335/17 |
| 5,907,687 A * | 5/1999 | McJunkin | 361/42 |
| 5,966,281 A * | 10/1999 | Larson | 361/103 |
| 6,057,751 A * | 5/2000 | Hung et al. | 337/377 |

\* cited by examiner

CIRCUIT PROTECTIVE DEVICE WITH TEMPERATURE SENSING

BACKGROUND OF THE INVENTION

The present invention relates to circuit breakers, and more particularly relates to over-current protection for circuit breakers.

Over current protection is provided by circuit breakers, fuses, and their associated switches, relays and other devices. Each type of equipment has variations in classes and ratings. Most types of over-current protection are designed to prevent damage to conductors and insulation from small or large excesses of current.

Circuit breakers, including molded case circuit breakers, protect against overheating of the conductor. The current path within a typical breaker is through a bimetallic strip; the resistance of the bimetal develops heat which causes the bimetal to bend until it moves far enough to unlatch the mechanism that allows the breaker to trip open. This is considered thermal tripping for overload currents.

The thermal action provides inverse time response. That is, a small overload takes a long time to heat the bimetal and trip the breaker. As the overload increases, the heating and tripping time is reduced. The larger the current, the less the tripping time, until the current reaches the setting of the magnetic trip. Magnetic response is instantaneous. Magnetic tripping is utilized for faster tripping at higher fault currents. Electronic circuit breakers may operate by sensing current level and trip when preset current is reached.

One known circuit breaker uses a temperature sensor to calibrate the bimetallic strip during the manufacturing of the product.

SUMMARY OF THE INVENTION

In an exemplary embodiment of the invention, a trip processing unit for a circuit breaker comprises a target for temperature measurement preferably located on the current path of the circuit breaker. The unit further includes a temperature sensor for reading the temperature of the target. A trip processor board within the circuit breaker receives temperature measurements from the temperature sensor. The temperature sensor triggers a trip signal in the trip processor board when a temperature of the target falls within a preselected critical range where further use of the circuit breaker could become detrimental to the conductors and insulation.

DETAILED DESCRIPTION OF THE INVENTION

Figure 1:
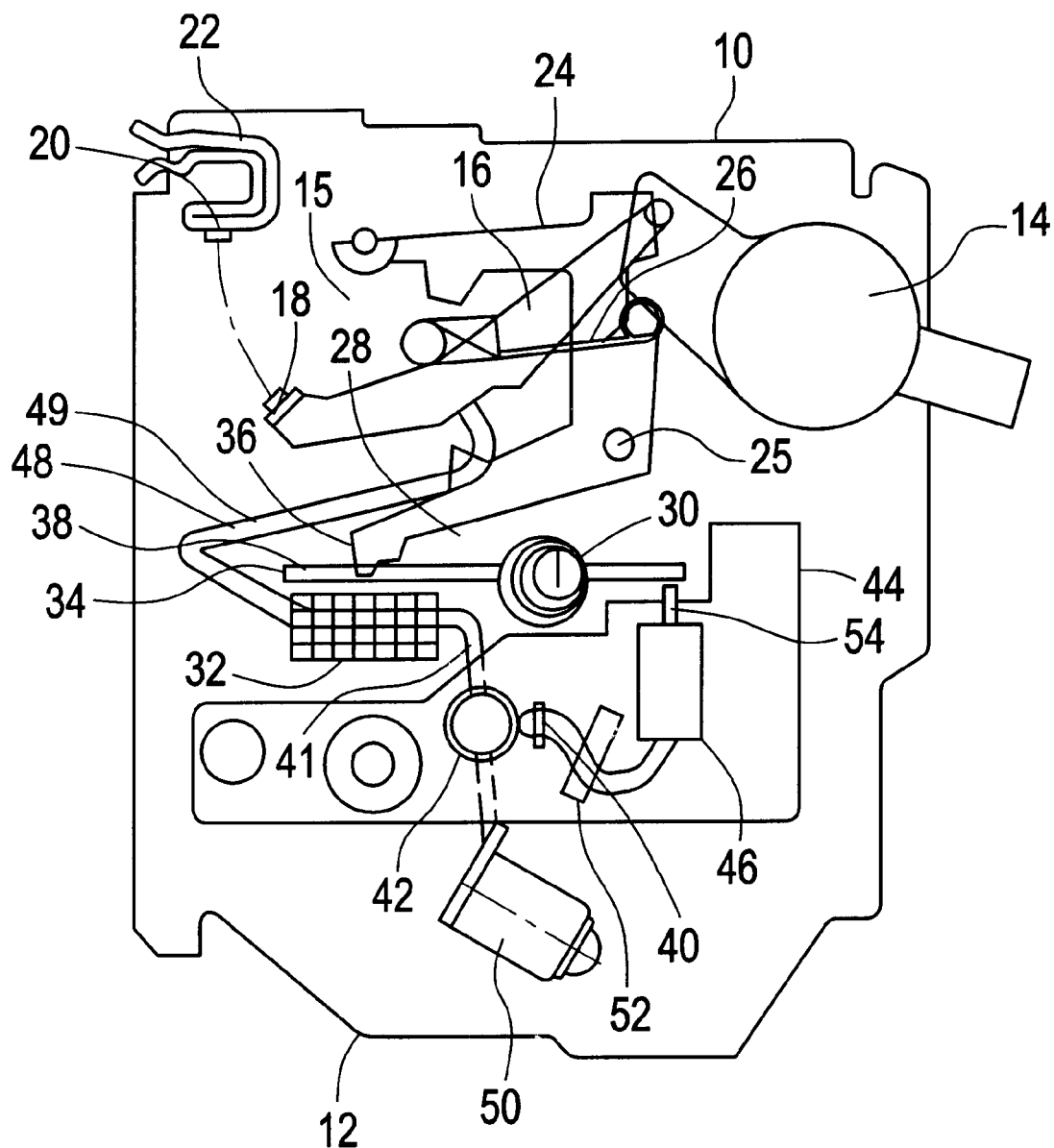
FIG. 1 is an internal plan view of a circuit breaker according to an embodiment of the present invention; and, FIGS. 2A–2C are temperature vs. time tables demonstrating the variance in tripping temperatures of prior art circuit breakers.

As can be seen in FIG. 1, an exemplary embodiment of the present invention involves a residential circuit breaker 10 having a plastic case 12. Although a residential circuit breaker is shown, the use of commercial or industrial circuit breakers, as well as other types of residential circuit breakers, are within the scope of this invention.

Extending within the circuit breaker 10 is a control handle 14 which may be used for manually operating the circuit breaker 10. The handle 14 is connected to a movable arm 16, which carries a movable contact 18. As is demonstrated by the curved arrow, the movable arm 16 can move the movable contact 18 into abutting relation with the stationary contact 20 attached to the line stab 22. Further included in the circuit breaker 10 is a connector lug 50 where a customer/end user connects load (e.g. a lamp or particular circuit) to the circuit breaker 10.

The present invention preferably includes a standard mechanical trip mechanism 15 composed of a cradle 24 biased by a cradle spring 26 in a counterclockwise direction about point 25 where the cradle 24 is attached within the case 12. The spring 26 interconnects the cradle 24 to the movable arm 16. A latch 28 is biased in a clockwise direction about a control spring 30. Cradle 24 includes a cradle tip 36, which extends through a latch window 38 formed in the latch 28. The latch 28 prevents the cradle 24 from rotating, thus maintaining the movable contact 18 of the movable arm 16 into contact (not shown) with the stationary contact 20. Sleeve 32 is shown adjacent latch 28. When movable contact 18 is in contact with stationary contact 20 a current path 48 through circuit breaker 10 is created. The current path 48 is formed through stab 22, stationary contact 20, movable contact 18, contact arm 16, flexible braid 49, bridge 41, and lug 50.

When a short circuit condition occurs at a high level of current within the protected circuit (e.g., seven times the rated current of the breaker), the magnetic force of the sleeve 32 will draw the latch 28 towards sleeve 32 allowing the cradle 24 to rotate in the counter clockwise direction. Such a movement of the cradle 24 will activate the cradle spring 26 in a manner that will pull the movable arm 16 and movable contact 18 away from the stationary contact 20. Thus, magnetic tripping is made possible.

The circuit breaker of the present invention is also designed to prevent damage to the protected circuit caused by overheating. A thermal trip processing unit 43 includes a temperature sensor 40, a target region 42, and a trip processor circuit board 44. The present invention utilizes the temperature sensor 40 to detect the temperature of a target region 42 on bridge 41. The temperature sensor 40 provides a signal indicative of this temperature to a trip processor circuit board 44 (which includes electronic circuit 52). If the temperature indicated by this signal is above a predetermined threshold, trip processor circuit board 44 provides a trip signal to a trip solenoid 46. In response to this trip signal, a plunger 54 in trip solenoid 46 extends, moving the latch 28 in a counter clockwise direction. Movement of latch 28 in the counter clockwise direction causes the trip mechanism 15 to separate contacts 18 and 20 in the manner previously described.

Advantageously, the present invention does not require a bimetallic member, previously located at location 34, to provide the motion required to unlatch the mechanism for thermal tripping. Because a bimetallic member is not required, the engagement of the cradle tip 36 into the latch window 38 and the tolerances and variations encountered in this area will not be a significant and tedious factor in the actuation or calibration of this breaker.

The molded case circuit breaker 10 of the present invention utilizes temperature sensor 40, as the means to detect a range of temperature variations within the current path 48 of the device. One suitable non-contact temperature sensor is that made by Exergen Corporation, product number IRt/c. 1X. Of course, improvements in size and accuracy of temperature sensors will dictate the most appropriate temperature sensor to employ in the present invention. That is, the employed temperature sensor 40 is preferably very accurate and small enough to fit within the confines of trip processor circuit board 44. Infrared technology allows very small devices to measure a large range of temperatures. Such an infrared device could be used as sensor 40 in a "non-contact" embodiment of the present invention. Alternatively, in a "contact" embodiment, a thermocouple could be used which is in contact with target 42. The temperature sensor 40 is shielded or insulated such that the effect of ambient temperature or heat emitted from components other than the target 42 is reduced.

The temperature sensor 40 monitors the target 42 at all times when the breaker is under power to provide a signal indicative of the target temperature to the trip processor circuit board 44. Certain temperature sensor devices known in the art utilize minimum amounts of radiant energy to self power their circuitry. Some of these devices can self-power at below ambient temperature. Utilizing such a device as the temperature sensor 40 would provide the opportunity of having a signal available for the trip board 44 even when the breaker 10 is not under power. In an alternative embodiment, utilizing such a self-powered device as the temperature sensor 40 would allow the sensor 40 to monitor the target 42 only when target 42 reaches a certain threshold temperature. In the latter embodiment, the reduction in the amount of time that sensor 40 monitors target 42 would increase the life of the sensor 40.

The target 42 is formed on bridge 41, and is included as part of the current path 48. For example, target 42 may be a reduced thickness section of the bridge 41 or a section of the bridge 41 between two apertures formed in the bridge 41 so as to create a "hot-spot" (a region of high temperature relative to the temperatures at other regions on bridge 41) at the target 42. In alternative embodiments, target 42 is a thermally-conductive device in intimate contact with bridge 41, such as a strip of metal, to conduct heat from bridge 41, or a device arranged proximate to bridge 41, such as a metal collar disposed about bridge 41, to receive heat emitted from bridge 41. Target 42 may preferably be black in color, to increase the emissivity of the target 42. If the temperature sensor device 40 is a contact device, such as a thermocouple, the device would be attached directly to bridge 41 or to another section of the current path 48.

The trip processor circuit board 44 provides a suitable location to mount temperature sensor 40. This location would be permanent and, once the board 44 is assembled into the molded case 12 of the breaker 10, a positive location for the sensor 40 is provided. Because of the importance of the focus distance in an infrared sensor, (distance in between the target 42 and the sensor 40) it is important to provide the sensor 40 with a constant focus point to the target 42. This will be achieved by the accurate positioning of the board 44 with respect to the bridge 41 in the molded case 12.

The solenoid 46 is mounted on trip processor circuit board 44. Solenoid 46 receives operating power, as well as a trip signal, from trip processing circuit board 44. Plunger 54 extends from solenoid 46 in response to the trip signal, thereby activating trip mechanism 15 to separate contacts 18 and 20. The trip processing circuit board 44 also contains the other components necessary within electronic circuit 52 to process the temperature sensor 40 signal and provide the trip signal to the solenoid 46 if the temperature sensor signal exceeds a predetermined threshold. This threshold temperature may be fixed or programmable by the installer or end user.

Because the present invention does not require the use of a bimetallic element to provide thermal protection, the present invention offers improvements and options over the prior art. For example, the present invention will allow the electronic calibration of the breaker rather than a mechanical one. By utilizing the present invention, all mechanical variations produced by the mechanism, such as latching forces, or engagement, will have no affect on calibration. Calibration of the breaker will be done at board level. This is an advantage over prior art designs, which use a mechanically linked bimetal to activate a tripping mechanism. Such prior art designs require the precise alignment of the bimetal and other components, as well as mechanical calibration to account for variations in the components.

Figure 2A:
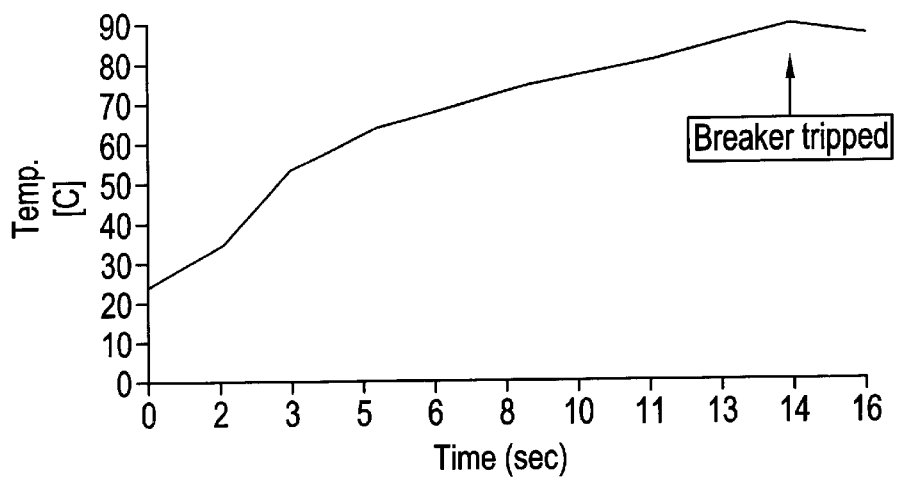
Figure 2B:
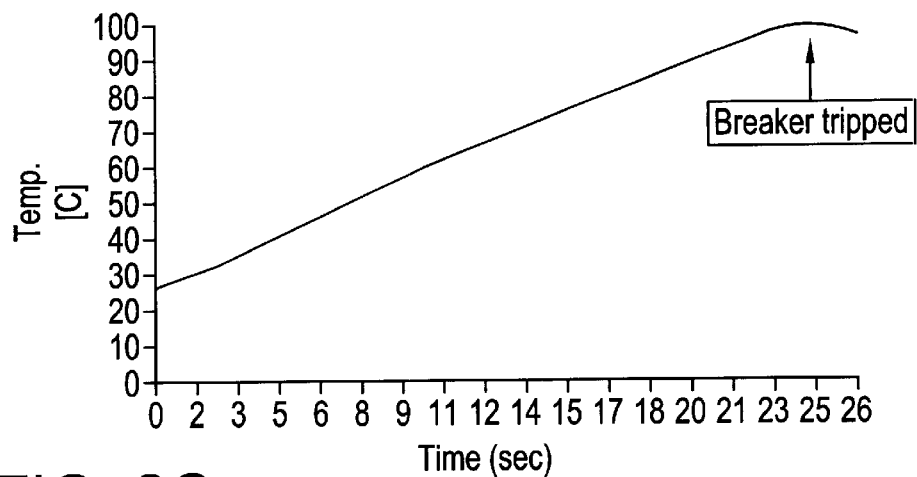
Figure 2C:
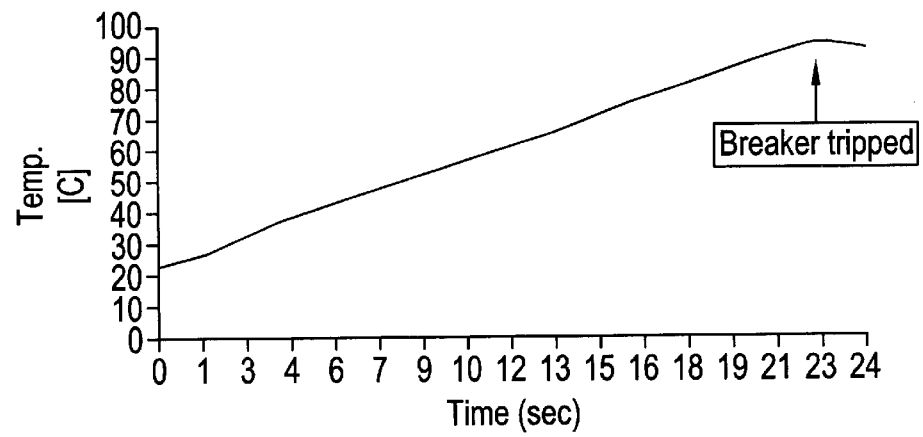

Another advantage of the present invention is that the tripping of the breaker 10 of the present invention will be substantially instantaneous once the threshold temperature is sensed, allowing little or no difference in the performance between two or more breakers employing the present invention. In contrast, the prior art design, employing a bimetallic strip, results in performance differences from one breaker to another. FIGS. 2A, 2B, and 2C provide a comparison of the performance of three similar, calibrated, prior-art circuit breakers. As can be seen in FIGS. 2A, 2B, and 2C, the difference in trip times between the circuit breakers is about 4.5 sec. The breaker in FIG. 2A trips at about 88 degrees, the breaker in FIG. 2B trips at about 99 degrees, and the breaker in FIG. 2C trips at about 93 degrees. While these prior art breakers are all properly calibrated, they all trip at a different temperatures. Thus, even when properly calibrated, the tripping temperature can vary by as much as 11 degrees in prior art breakers. However, a circuit breaker employing a temperature sensor, as described in the present invention, will result in no more than 3 to 4 degrees difference in the tripping temperature between two or more properly calibrated circuit breakers.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A trip processing unit for a circuit breaker, the unit comprising:
    a target for temperature measurement;
    a temperature sensor providing a signal indicative of temperature of said target when current flows through the circuit breaker; and,
    a trip processor board for receiving said signal indicative of temperature measurements from the temperature sensor; wherein the temperature sensor triggers a trip signal on the trip processor board when a temperature of the target falls within a preselected range set in the trip processor board.

2. The unit of claim 1 further comprising a current path adapted for circuit breaker use, the target located on the current path.

3. The unit of claim 2 further comprising a bridge connecting two sections of the current path and adjacent the target, the bridge allowing current flow in the circuit breaker when a temperature of the target falls outside the preselected range.

4. The unit of claim 1 wherein the target is black.

5. The unit of claim 1 wherein the temperature sensor is a non-contact infrared sensor mounted to the trip processor board.

6. The unit of claim 1 wherein the temperature sensor is a thermocouple in contact with the target.

7. A circuit breaker comprising a trip processor board;

a current path; and, a temperature sensor adapted to detect temperature in the current path, the temperature sensor providing a signal indicative of temperature in the current path when current flows through the circuit breaker, wherein the temperature sensor triggers a trip signal on the trip processor board when a temperature in the current path falls within a preselected range set in the trip processor board.

8. The circuit breaker of claim 7 further comprising a trip mechanism, wherein the trip mechanism becomes unlatched when the trip signal is triggered.

9. The circuit breaker of claim 8 further comprising a solenoid which unlatches the trip mechanism when the trip processor board triggers the trip signal.

10. The circuit breaker of claim 7 wherein the current path comprises a target, wherein the temperature sensor is configured to sense temperature in the target.

11. The circuit breaker of claim 10 further comprising a bridge connecting two sections of the current path adjacent the target, the bridge providing a continuance of normal operation of the circuit breaker within a window of operable temperatures and outside the preselected range.

12. The circuit breaker of claim 11 wherein the temperature sensor is a non-contact infrared sensor.

13. The circuit breaker of claim 12 wherein the infrared sensor is aimed at the target for temperature measurement.

14. The circuit breaker of claim 12 wherein the infrared sensor is mounted on the trip processor board.

15. The circuit breaker of claim 7 wherein the temperature sensor is a thermocouple.

16. The circuit breaker of claim 15 wherein the thermocouple is attached to a section of the current path.

17. The circuit breaker of claim 7 wherein the temperature sensor is shielded for reading only a temperature of a selected location in the current path and for ignoring ambient temperature.

18. The circuit breaker of claim 7 wherein the temperature sensor is self-powered and does not begin to detect temperature in the current path until a preselected threshold is reached.

19. The circuit breaker of claim 7 wherein the preselected range of temperature on the current path may be varied by a user of the circuit breaker to accommodate varying needs after installation of the circuit breaker.

20. A method for triggering a trip mechanism in a circuit breaker, the method comprising the steps of:

selecting a range of temperatures in a current path when the circuit breaker should be tripped;

selecting a target in the current path for temperature measurement;

mounting a temperature sensor within the circuit breaker, said temperature sensor providing a signal indicative of temperature of said target when current flows through the circuit breaker;

positioning the temperature sensor to read temperatures of the target;

mounting a trip processor board within the circuit breaker;

triggering a trip signal in the trip processor board when the signal indicative of temperature of the target read by the temperature sensor falls within the range of temperatures; and, triggering a solenoid to unlatch the trip mechanism of the circuit breaker once the trip signal is triggered in the trip processor board.

* * * * *